(12) United States Patent
Eliyahu et al.

(10) Patent No.: US 9,303,135 B2
(45) Date of Patent: Apr. 5, 2016

(54) INK JET INK FOR INDIRECT PRINTING APPLICATIONS

(71) Applicant: Xerox Corporation, Norwalk, CT (US)

(72) Inventors: Jenny Eliyahu, Maple (CA); Daryl W. Vanbesien, Burlington (CA); Michelle N. Chrétien, Mississauga (CA); Marcel P. Breton, Mississauga (CA); Barkev Keoshkerian, Thornhill (CA)

(73) Assignee: Xerox Corporation, Norwalk, CT (US)

( * ) Notice: Subject to any disclaimer, the term of this patent is extended or adjusted under 35 U.S.C. 154(b) by 77 days.

(21) Appl. No.: 14/066,716

(22) Filed: Oct. 30, 2013

(65) Prior Publication Data

US 2015/0116414 A1    Apr. 30, 2015

(51) Int. Cl.
| | |
|---|---|
| B41J 2/01 | (2006.01) |
| C08K 3/04 | (2006.01) |
| C09D 167/02 | (2006.01) |
| C08K 5/5419 | (2006.01) |
| B41J 2/21 | (2006.01) |
| C09D 11/104 | (2014.01) |
| C09D 11/30 | (2014.01) |

(52) U.S. Cl.
CPC ............... *C08K 3/04* (2013.01); *B41J 2/2107* (2013.01); *C08K 5/5419* (2013.01); *C09D 11/104* (2013.01); *C09D 11/30* (2013.01); *C09D 167/02* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ............ 347/100, 95, 96, 101, 102; 106/31.6, 106/31.13, 31.27; 523/160, 161
See application file for complete search history.

(56) References Cited

U.S. PATENT DOCUMENTS

| | | |
|---|---|---|
| 5,389,958 A | 2/1995 | Bui et al. |
| 6,063,827 A | 5/2000 | Sacripante et al. |
| 6,593,049 B1 | 7/2003 | Veregin et al. |
| 6,756,176 B2 | 6/2004 | Stegamat et al. |
| 6,830,860 B2 | 12/2004 | Sacripante et al. |
| 2006/0222991 A1 | 10/2006 | Sacripante et al. |
| 2012/0015205 A1 | 1/2012 | Snyder et al. |

(Continued)

OTHER PUBLICATIONS

Eliyahu, et al., U.S. Appl. No. 14/067,469, filed Oct. 30, 2013, "Inkjet Ink Containing Polystyrene Copolymer Latex Suitable for Indirect Printing," not yet published.

(Continued)

*Primary Examiner* — Manish S Shah
(74) *Attorney, Agent, or Firm* — Marylou J. Lavoie, Esq. LLC (57) ABSTRACT

An aqueous ink for indirect printing applications including water; a co-solvent; a colorant; and a polymer latex comprising an aqueous dispersion of polymer particles wherein the polymer latex has a softening temperature of from about 60° C. to less than 105° C. and a glass transition temperature of from about 45° C. to about 100 C.

15 Claims, 3 Drawing Sheets

(56) References Cited

U.S. PATENT DOCUMENTS

| | | | |
|---|---|---|---|
| 2012/0125228 A1* | 5/2012 | Iftime | 106/31.14 |
| 2012/0128949 A1* | 5/2012 | Goto | 347/21 |
| 2012/0270984 A1* | 10/2012 | Mitsuishi et al. | 106/31.13 |
| 2014/0220312 A1 | 8/2014 | Wu et al. | |

OTHER PUBLICATIONS

Shimomura et al., Ink for Use in Ink-Jet Printer, Machine translation from Japan Platform for Patent Information, Abstract and Claim, Japanese Patent Publication No. 06-340835, Published Dec. 13, 1994, 2 pages.

* cited by examiner

INK JET INK FOR INDIRECT PRINTING APPLICATIONS

RELATED APPLICATIONS

Commonly assigned U.S. patent application Ser. No. 14/067,469, entitled "Inkjet Ink Containing Polystyrene Copolymer Latex Suitable For Indirect Printing", with the named inventors Jenny Eliyahu, Daryl Vanbesien, Michelle Chrétien, Marcel Breton, and Barkev Keoshkerian, filed concurrently herewith, is hereby incorporated by reference herein in its entirety.

BACKGROUND

Disclosed herein is an aqueous ink for indirect printing applications including water; a co-solvent; a colorant; and a polymer latex comprising an aqueous dispersion of polymer particles wherein the polymer latex has a softening temperature of from about 60° C. to less than 105° C. and a glass transition temperature of from about 45° C. to about 100° C.

In direct printing machines, a marking material is applied directly to a final substrate to form the image on that substrate. Other types of printing machines use an indirect or offset printing technique. In indirect printing, the marking material is first applied onto an intermediate transfer member, and is subsequently transferred to a final substrate.

Figure 1:
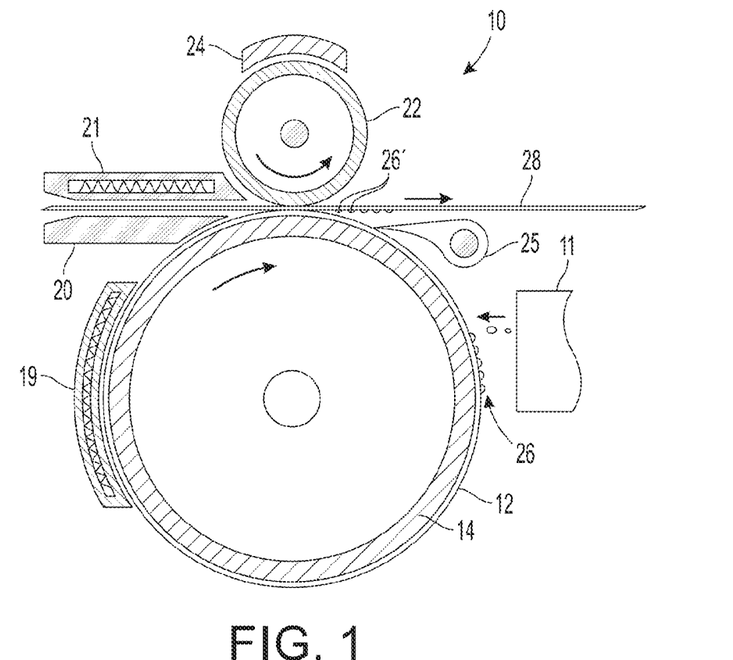
FIG. 1 is a diagrammatic illustration of an indirect or offset printing apparatus.

In one type of indirect printing machine, a piezoelectric ink jet print head is used to apply ink to the intermediate transfer material layer. The ink can be disposed on a liquid layer which can be in the form of a release agent, such as oil, that is capable of supporting the printed image for subsequent transfer. The intermediate image is transferred by contact between the transfer drum and the substrate, typically with the assistance of a pressure roller or drum. An exemplary indirect printing apparatus 10 is shown in FIG. 1. In this apparatus, a print head 11 directs a marking material, such as ink droplets, onto a layer 12 of intermediate transfer material to form an image 26. This transfer material layer 12 is carried by an intermediate transfer member 14, which in the illustration is a rotating drum or roller. An optional heater 19 can be provided to control the temperature of the ink image prior to contacting the substrate 28.

The substrate 28 is conveyed between the intermediate transfer member 14 and a transfer or pressure roller 22. Optional heaters 20 and 21 can be provided to pre-heat the substrate 28 to facilitate reception of the image. An optional heater 24 can be provided to heat the transfer roller 22. As the substrate is conveyed between the rotating rollers 14 and 22, the image 26 is transferred onto the substrate as image 26'. Appropriate pressure is maintained between the two rollers so that the image 26' is properly spread, flattened, and adhered onto the substrate 28. An optional stripper 25 can be provided that assists in removing any ink remaining on the intermediate transfer member 14 prior to receiving a new ink image 26 from the print head 11.

A two step printing process, then, can comprise applying an ink in an imagewise fashion onto an intermediate receiving member such as a drum, belt, etc., using an ink jet print head. The ink wets and spreads on the intermediate receiving member to form a transient image. The ink forming the transient image can then undergo a change in properties such as partial or complete drying, thermal or photo-curing, gelating, etc., and the resulting transient image can be transferred to a final image receiving substrate.

While known ink compositions and processes are suitable for their intended purposes, a need remains for improved ink compositions with certain characteristics. A need remains for inks, specifically inks for indirect printing systems, that are compatible with different printing subsystems including jetting and transfer subsystems, and which enable high quality printing at high speed. What is further needed is an indirect printing ink that enables and performs well in both wetting and transfer subsystems. What is further need is an indirect printing ink that displays acceptable wettability characteristics while also displaying acceptable transfer characteristics.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an aqueous ink for indirect printing applications comprising water; a co-solvent; a colorant; and a polymer latex comprising an aqueous dispersion of polymer particles wherein the polymer latex has a softening temperature of from about 60° C. to less than 105° C. and a glass transition temperature of from about 45° C. to about 10° C.

Also described is a process comprising incorporating an aqueous ink comprising water; a co-solvent; a colorant; and a polymer latex comprising an aqueous dispersion of polymer particles wherein the polymer latex has a softening temperature of from about 60° C. to less than 105° C. and a glass transition temperature of from about 45° C. to about 100° C. into an ink jet printing apparatus; ejecting the ink in an imagewise pattern onto an intermediate transfer member; heating the image to partially or completely remove solvents; and transferring the ink in the imagewise pattern from the intermediate transfer member to a final recording substrate.

DETAILED DESCRIPTION

An ink composition for indirect printing applications is provided comprising water, a co-solvent; a colorant; and a polymer latex comprising an aqueous dispersion of polymer particles wherein the polymer latex has a softening temperature of from about 60° C. to less than 105° C. and a glass transition temperature of from about 45° C. to about 100° C.

The present embodiments, then, comprise an aqueous ink for indirect printing applications wherein the aqueous ink comprises some latex particles that are amorphous and some latex particles that are crystalline in nature and further wherein the amorphous latex particles have a glass transition temperature as described herein and wherein the crystalline latex particles have a melting point as described herein. The aqueous ink composition herein can also comprise a blend of composite latex particles including amorphous latex particles and crystalline latex particles. In embodiments, the ink composition comprises amorphous polyester latex particles having a glass transition temperature of from about 45° C. to about 100° C. and crystalline polyester latex particles having a melting point of from about 50° C. to about 90° C. In further embodiments, the ink composition comprises a composite latex particle, wherein the composite latex particle comprises an amorphous polyester having a glass transition temperature of from about 45° C. to about 100° C. and a crystalline polyester having a melting point of from about 50° C. to about 90° C. The composite latex particle can be prepared by any suitable means as known in the art. For example, the composite latex particle can be prepared using a two-step emulsion polymerization process, a self-emulsification process in which a first monomer is diffused into a second monomer in an aqueous dispersion and then polymerized, a dispersion polymerization including preparation of a core-shell particle wherein either of the amorphous or crystalline polyester can be selected for the core or the shell, among other methods as would be apparent to one of skill in the art.

The ink herein is particularly useful for indirect printing applications wherein the ink wets the intermediate receiving member enabling formation of a transient image on the intermediate receiving member while undergoing a stimulus induced property change which enables release from the intermediate receiving member in the transfer printing step. In embodiments, the ink undergoes partial or complete drying while on the intermediate transfer member.

Ink compositions herein are specifically suitable for indirect printing systems, are compatible with different printing subsystems including jetting and transfer subsystems, and enable high quality printing at high speed. In embodiments, ink compositions herein enable and perform well in both wetting and transfer subsystems, displaying both acceptable wettability characteristics in combination with acceptable release and transfer characteristics.

The ink compositions herein have a selected combination of softening temperature and glass transition temperature that enables improved functioning in an indirect or transfuse printing process.

In embodiments, the ink compositions include a polymer latex having a softening temperature of from about 40° C. to less than 105° C., from about 50° C. to less than 105° C., from about 60° C. to less than 105° C., or from about 70° C. to less than 105° C. In further embodiments, the ink compositions include a polymer latex having a softening temperature of from about 40° C. to less than 100° C., from about 50° C. to less than 100° C., from about 60° C. to less than 100° C., or from about 70° C. to less than 100° C.

In specific embodiments, the polymer latex comprises a polyester having a softening temperature of from about 40° C. to less than 105° C., from about 60° C. to less than 105° C., or from about 70° C. to less than 105° C. In a specific embodiment, the polymer latex comprises a polyester having a softening temperature of from about 60° C. to less than 105° C. In further embodiments, the polymer latex comprises a polyester having a softening temperature of from about 40° C. to less than 100° C., from about 60° C. to less than 100° C., or from about 70° C. to less than 100° C.

In further embodiments, the polymer latex comprises an amorphous polyester having a glass transition temperature of from about 40° C. to about 150° C., from about 45° C. to about 100° C., from about 45° C. to about 90° C., from about 60° C. to about 120° C., or from about 70° C. to less than about 110° C. In embodiments, the polymer latex also comprises a crystalline resin. The crystalline resin, in embodiments, crystalline polyester, can possess various melting points, in embodiments, the crystalline resin can have a melting point of from about 30° C. to about 120° C., from about 50° C. to about 90° C., or from about 60° C. to less than about 80° C.

In embodiments, an aqueous ink here comprises a polymer latex comprising an amorphous polyester having a glass transition temperature of from about 45° C. to about 100° C. and a crystalline polyester having a melting point of from about 50° C. to about 90° C.

In further embodiments, the polymer latex has a molecular weight of from about 5,000 to about 40,000 g/mole.

In embodiments, the ink composition herein includes polymer particles having a volume average particle diameter of from about 50 to about 800 nanometers, from about 50 to less than about 500 nanometers, or from about 50 to less than about 300 nanometers.

Polymer Latex.

In embodiments, the ink composition herein is based on an aqueous formulation comprising a polymer latex comprising an aqueous dispersion of polymer particles wherein the polymer latex has a softening temperature of from about 60° C. to less than 105° C., or from about 50° C. to less than 105° C., and a glass transition temperature of from about 45° C. to about 90 C.

The polymer latex can comprise any suitable or desired polymer material.

In embodiments, the polymer latex comprises an aqueous dispersion of polyester. Any suitable or desired polyester can be used for the ink compositions herein. In embodiments, the polyester can be a material described in U.S. Pat. No. 6,593, 049 and U.S. Pat. No. 6,756,176, which are each hereby incorporated by reference herein in their entireties. Suitable resins can also include a mixture of an amorphous polyester resin and a crystalline polyester resin as described in U.S. Pat. No. 6,830,860, which is hereby incorporated by reference herein in its entirety.

In a specific embodiment, the ink compositions herein include a polymer latex comprising an amorphous polyester, a crystalline polyester, or a mixture of amorphous polyester and crystalline polyester.

In embodiments, the resin can be a polyester resin formed by reacting a diol with a diacid in the presence of an optional catalyst. For forming a crystalline polyester, suitable organic diols include aliphatic diols having from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and the like, including their structural isomers.

The aliphatic diol can be selected in any suitable or desired amount, in embodiments, from about 40 to about 60 mole percent, or from about 42 to about 55 mole percent, or from about 45 to about 53 mole percent, and, in embodiments, a second diol can be selected in any suitable or desired amount, in embodiments, from about 0 to about 10 mole percent, or from about 1 to about 4 mole percent of the resin.

Examples of organic diacids or diesters including vinyl diacids or vinyl diesters that can be selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a diester or anhydride thereof, and mixtures and combinations thereof.

The organic diacid can be selected in any suitable or desired amount, in embodiments, from about 40 to about 60 mole percent, or from about 42 to about 52 mole percent, or from about 45 to about 50 mole percent, and in embodiments, a second diacid can be selected in any suitable or desired amount, such as from about 0 to about 10 mole percent of the resin.

Polyester based crystalline resins include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene-dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate).

Examples of diacid or diesters selected for the preparation of amorphous polyesters include dicarboxylic acids or diesters such as terephthalic acid, phthalic acid, isophthalic acid, fumaric acid, trimellitic acid, dimethylfumarate, dimethylitaconate, cis-1,4-diacetoxy-2-butene, diethyl fumarate, diethyl maleate, maleic acid, succinic acid, itaconic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures and combinations thereof. The organic diacid or diester may be present in any suitable or desired amount, for example, in an amount from about 40 to about 60 mole percent of the resin, or from about 42 to about 55 mole percent of the resin, or from about 45 to about 53 mole percent of the resin.

Examples of diols which can be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene, and mixtures and combinations thereof. The amount of organic diol selected can vary, and may be selected in any suitable or desire amount, for example, in an amount of from about 40 to about 60 mole percent of the resin, or from about 42 to about 55 mole percent of the resin, or from about 45 to about 53 mole percent of the resin.

In embodiments, polycondensation catalysts may be used in forming the polyesters. Polycondensation catalysts which may be utilized for either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, and mixtures and combinations thereof. Such catalysts may be utilized in any suitable or desired amount, such as from about 0.01 mole percent to about 5 mole percent based on the starting diacid or diester used to generate the polyester resin.

In embodiments, as noted above, an unsaturated, amorphous polyester resin may be utilized as the polyester herein. Examples of such resins include those disclosed in U.S. Pat. No. 6,063,827, the disclosure of which is hereby incorporated by reference herein in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be a an amorphous polyester such as a poly(propoxylated bisphenol A co-fumarate) resin having the formula wherein m is an integer, in embodiments of from about 5 to about 1000, or from about 10 to about 500, or from about 15 to about 200.

An example of a linear propoxylated bisphenol A fumarate resin which may be utilized as a latex resin is the resin available under the trade name SPAR11 from Resana S/A Industrias Quimicas, Sao Paulo, Brazil. Other propoxylated bisphenol A fumarate resins that may be utilized and are commercially available include GTUF and FPESL-2 from Kao Corporation, Japan, and EM181635 from Reichhold, Research Triangle Park, North Carolina.

Suitable crystalline resins which may be utilized, optionally in combination with an amorphous resin as described above, include those disclosed in U.S. Patent Publication 2006/0222991, the disclosure of which is hereby incorporated by reference herein in its entirety. In embodiments, a suitable crystalline resin may include a resin formed of ethylene glycol and a mixture of dodecanedioic acid and fumaric acid co-monomers of the formula wherein b is an integer, in embodiments, of from about 5 to about 2,000 and d is an integer, in embodiments, of from about 5 to about 2,000.

For example, in embodiments, a poly(propoxylated bisphenol A co-fumarate) resin as described above may be combined with a crystalline resin to form a latex emulsion. In a specific embodiment, the ink composition herein includes a polymer latex comprising poly(co-propoxylated bisphenol co-terephthalate co-fumarate, a crystalline polyester, in embodiments, poly(1,9-nonanediol-co-dodecanedioic acid), or a mixture thereof.

In embodiments, the resin may possess acid groups which, in embodiments, may be present at the terminal of the resin. Acid groups which may be present include carboxylic acid groups, and the like. The number of carboxylic acid groups may be controlled by adjusting the materials utilized to form the resin and the reaction conditions.

In embodiments, the polyester resin may have an acid number from about 2 mg KOH/g of resin to about 200 mg KOH/g of resin, or from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all of the acid groups on the resin identified as the end point of the titration.

In embodiments, the polyester emulsion or latex has a volume average particle size of from about 20 nanometers (nm) to about 1000 nm, or from about 20 to about 800 nm, or from about 50 to about 800 nm, or from about 50 to about 500 nm, or from about 50 to about 300 nm, or from about 100 to about 300 nanometers.

The characteristics of the latex may be determined by any suitable technique and apparatus. Volume average particle diameter may be measured by means of a measuring instrument such as a light scattering particle sizer, operated in accordance with the manufacturer's instructions. Volume average particle diameter may also be measured by means of a measuring instrument such as a Beckman Coulter Multisizer 3, operated in accordance with the manufacturer's instructions.

In a specific embodiment, the polyester is a compound of the formula wherein R is hydrogen or methyl, m is an integer of from about 2 to about 10, and n is an integer of from about 2 to about 10.

In embodiments, the polymer latex comprises a combination of amorphous polymer and crystalline polyester present in a ratio of 90 percent amorphous polyester and 10 percent crystalline polyester, by weight, based on the total weight of both the amorphous and crystalline polyester.

In embodiments, the polymer latex may be present in any desired or effective amount, such from about 0.1 to about 25 percent, or from about 1 to about 20 percent, or from about 3 to about 20 percent, or from about 2 to about 14 percent, by weight, based on the total weight of the ink composition.

Water and Co-Solvent.

The ink compositions herein can consist solely of water, or can comprise a mixture of water and a water soluble or water miscible organic component, referred to as a co-solvent, humectant, or the like (hereinafter co-solvent) such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxypropionic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof. When mixtures of water and water soluble or miscible organic liquids are selected as the liquid vehicle, the water to organic ratio ranges can be any suitable or desired ration, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The organic component of the ink vehicle can also serve to modify ink surface tension, modify ink viscosity, dissolve or disperse the colorant, and/or affect the drying characteristics of the ink.

In certain embodiments, the co-solvent is selected from the group consisting of sulfolane, methyl ethyl ketone, isopropanol, 2-pyrrolidinone, polyethylene glycol, and mixtures thereof.

The total amount of liquid vehicle can be provided in any suitable or desired amount. In embodiments, the liquid vehicle is present in the stretchable in composition in an amount of from about 75 to about 97 percent, or from about 80 to about 95 percent, or from about 85 to about 95 percent, by weight, based on the total weight of the stretchable ink composition.

Colorant.

The ink composition herein may also contain a colorant. Any suitable or desired colorant can be used in embodiments herein, including pigments, dyes, dye dispersions, pigments dispersions, and mixtures and combinations thereof.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

As noted, any suitable or desired colorant can be selected in embodiments herein. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof.

Examples of suitable pigments include black pigments, white pigments, cyan pigments, magenta pigments, yellow pigments, or the like. Further, pigments can be organic or inorganic particles. Suitable inorganic pigments include carbon black. However, other inorganic pigments may be suitable such as titanium oxide, cobalt blue ($CoO—Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW 5160, FW 5170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The colorant can be present in the ink composition in any desired or effective amount, in embodiments, the colorant can be present in an amount of from about 0.05 to about 15 percent, or from about 0.1 to about 10 percent, or from about 1 to about 5 percent by weight, based on the total weight of the stretchable ink composition.

Surfactant.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethyl ammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™ IGEPAL CA-520™, IGEPAL CA-720™, IGEPAL CO-890™, IGEPAL C0-720™, IGEPAL C0-290™, IGEPAL CA-21OTM, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C 12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

Crosslinking Agent.

The ink composition can further comprise crosslinkers. In embodiments, the crosslinker is an organoamine, a dihydroxy aromatic compound, isocyanate, a peroxide, a metal oxide, or the like, as well as mixtures thereof. Crosslinking can further enhance the physical properties of the images generated from the ink composition. The crosslinker can be present in any desired or effective amount, in embodiments from about 0.1 to about 20 percent, or from 5 to about 15 percent, by weight, based on the total weight of the ink composition.

Additives.

The ink composition can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

In embodiments, the ink composition is a low-viscosity composition. The term "low-viscosity" is used in contrast to conventional high-viscosity inks such as screen printing inks, which tend to have a viscosity of at least 1,000 centipoise (cps). In specific embodiments, the ink disclosed herein has a viscosity of no more than about 100 cps, no more than about 50 cps, or no more than about 20 cps, or from about 2 to about 30 cps at a temperature of about 30° C., although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is at least about 1 centipoise, no more than about 10 centipoise, no more than about 7 centipoise, or no more than about 5 centipoise, although the viscosity can be outside of these ranges. For piezoelectric ink jet printing, at the jetting temperature, the ink viscosity is at least about 2 centipoise, at least about 3 centipoise, no more than about 20 centipoise, no more than about 15 centipoise, or no more than about 10 centipoise, although the viscosity can be outside of these ranges. The jetting temperature can be as low as about 20 to 25° C., and can be as high as about 70° C., as high as about 50° C., or as high as about 40° C., although the jetting temperature can be outside of these ranges.

In certain embodiments, the ink compositions herein have a viscosity of from about 2 to about 20 centipoise at a temperature of about 30° C.

The ink compositions herein have selected surface tension characteristics that provide wetting and release properties suitable for indirect printing applications. In embodiments, the ink composition is selected to provide a surface tension, viscosity, and particle size that is suitable for use in a piezoelectric ink jet print head.

In embodiments, the ink composition herein has a surface tension of from about 15 to about 50 dynes per centimeter, or from about 18 to about 38 dynes per centime, or from about 20 to about 35 dynes per centimeter, although the surface tension can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

In a specific embodiment, the inks are prepared as follows: 1) preparation of a polymer latex optionally stabilized with a surfactant; 2) preparation of a dispersion of a colorant optionally stabilized with a surfactant; 3) mixing of the polymer latex with the colorant dispersion; 4) optional filtering of the mixture; 5) addition of other components such as water, cosolvents, and optional additives; and 6) optional filtering of the composition.

Also disclosed herein is a process which comprises applying an ink composition as disclosed herein to a substrate in an imagewise pattern.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, a process herein comprises incorporating an ink prepared as disclosed herein into an ink jet printing apparatus, ejecting ink droplets in an imagewise pattern onto an intermediate transfer member, heating the image to partially or completely remove solvents, and transferring the ink in the imagewise pattern from the intermediate transfer member to a final recording substrate. In a specific embodiment, the intermediate transfer member is heated to a temperature above that of the final recording sheet and below that of the ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed as the final recording sheet, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Amorphous Polyester Dispersion. 190 grams of poly(co-propoxylated bisphenol co-terephthalate co-fumarate polyester resin are weighed out in a 1 Liter kettle. 100 grams of methyl ethyl ketone (MEK) and 40 grams of isopropanol (IPA) are weighed out separately and mixed together in a beaker. The solvents are poured into the 1 Liter kettle containing the resin. The kettle, with its cover on, a gasket, a condenser and 2 rubber stoppers, is placed inside a water bath set at 48° C. for 1 hour until the resins become "soft". The anchor blade impeller is set up in the kettle and is switched on to rotate at approximately 150 revolutions per minute (rpm). After 3 hours, when all of the resins have dissolved, 8.69 grams of 10% $NH_4OH$ is added to the mixture drop-wise with a disposable pipette through a rubber stopper. The mixture is left to stir for 10 minutes. 600 grams of de-ionized water (DIW) is to be added into the kettle by a pump through a rubber stopper. The first 400 grams are added in 90 minutes with the pump set to a rate of 4.44 grams/minute. The last 200 grams are added in 30 minutes with the pump set to 6.7 grams/minute. The apparatus is dismantled, and the mixture is poured into a glass pan, which is kept in the fume hood overnight and stirred by a magnetic stir-bar so that the solvent can evaporate off. The particle size as measured by a NiComp Particle Analyzer was 170 nanometers.

Example 2

Crystalline Polyester Dispersion. A crystalline polyester dispersion was prepared as in Example 1 except that poly(1, 9-nonanediol-co-dodecanedioic acid), a crystalline polyester, was used in place of the amorphous polyester.

Example 3

An ink having the components shown in Table 1 was prepared as follows. To a 50 milliliter amber glass vial was added surfactant and carbon black dispersion, while the mixture was stirred with a magnetic stir bar at 200 RPM, water (about 20% to wash latex beaker) was slowly added. The pH of the latex was separately adjusted to 6.8 and then slowly added to vial which was chased with 20% water to clean latex residuals. The ink was then homogenized for 5 minutes at 2000 RPM.

Example 4

An ink having the components shown in Table 2 was prepared as follows. To a 50 milliliter amber glass vial was added surfactant and carbon black dispersion, while the mixture was stirred with a magnetic stir bar at 200 RPM, water (about 20% to wash latex beaker) was slowly added. The pH of the latex was separately adjusted to 6.8 and then slowly added to vial which was chased with 20% water to clean latex residuals. The ink was then homogenized for 5 minutes at 2000 RPM.

TABLE 1

Amorphous Polyester Ink

| Component | Solids Weight Percent In Ink | Solids (Of Stock Solution) | Actual Mass (grams) |
|---|---|---|---|
| poly(co-propoxylated bisphenol co-terephthalate co-fumarate latex | 10.00 | 35.97 | 5.560 |
| Sulfolane (5% water) | 15.84 | 95.00 | 3.335 |
| 2-pyrrolidinone | 3.33 | 100 | 0.666 |
| Polyethylene glycol (MW 20,000) | 0.72 | 100 | 0.144 |
| Regal ® 300* | 3.30 | 14.87 | 4.439 |
| BYK ®-347** | 0.16 | 100 | 0.032 |
| Water | 52.03 | 100 | 5.824 |
| TOTAL | | | 20 |

*Regal ® 300 carbon black, Cabot Corporation.
**BYK ®-347 silicone surfactant, BYK Additives and Instruments.

TABLE 2

Amorphous and Crystalline Polyester Ink

| Component | Solids Weight Percent In Ink | Solids (Of Stock Solution) | Actual Mass (grams) |
|---|---|---|---|
| poly(co-propoxylated bisphenol co-terephthalate co-fumarate latex | 8.00 | 35.97 | 4.448 |
| poly(1,9-nonanediol-co-dodecanedioic acid) | 2.00 | 35.60 | 1.236 |
| Sulfolane (5% water) | 15.84 | 95.00 | 3.335 |
| 2-pyrrolidinone | 3.33 | 100 | 0.666 |
| Polyethylene glycol (MW 20,000) | 0.72 | 100 | 0.144 |
| Regal ® 300 | 3.30 | 14.87 | 4.438 |
| BYK ®-347 | 0.16 | 100 | 0.032 |
| Water | 52.03 | 100 | 6.937 |
| TOTAL | | | 21.236 |

Ink Characterization.
Rheology and Particle Size.
The inks of both Examples 3 and 4 were found to have viscosities suitable for jetting, that is, less than about 10 centipoise at a jetting temperature of about 30° C., and a pigment particle size of less than about 150 nanometers as determined using a Malvern Zetasizer.

Surface tension data is shown in Table 3 and was obtained as follows. The inks of examples 3 and 4 were measured on a K-100 Surface Tensiometer, available from Krüss GmbH, equipped with a Wilhelmy plate, at room temperature of about 27° C. Surface tension data was determined over an average of 20 data points taken from 1 second to 60 seconds.

TABLE 3

| Ink Example | Polyester | Viscosity (cP) at 35° C. | Surface Tension (dynes/cm) |
|---|---|---|---|
| 3 | Amorphous | 5 | 22.2 |
| 4 | Amorphous and Crystalline | 5 | 21.5 |

Jetting and Transfer.

Figure 2:
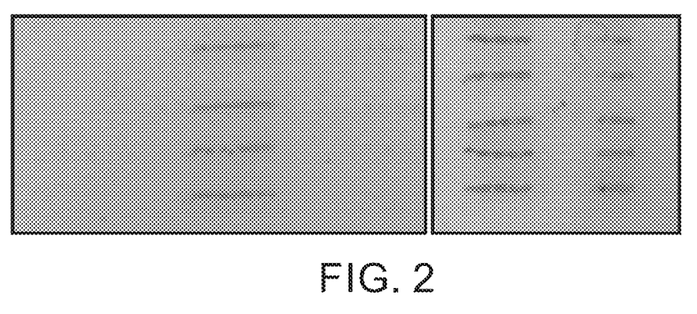
FIG. 2 is a drawing of an optical microscope image of an amorphous polyester ink (left) and an ink of the present disclosure comprising a combination of amorphous and crystalline polyester (right) jetted onto a blanket.
Figure 3:
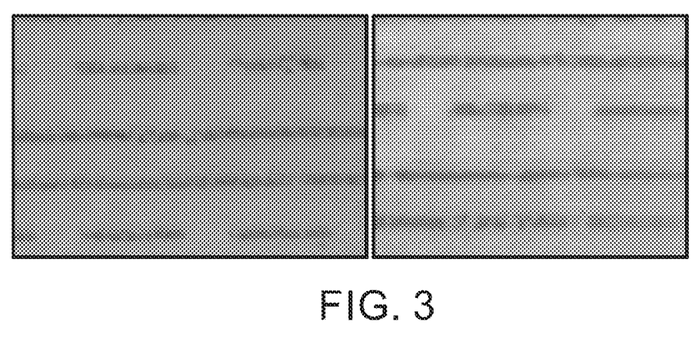
FIG. 3 is a drawing of an optical microscope image of an amorphous polyester ink (left) and an ink of the present disclosure comprising a combination of amorphous and crystalline polyester (right) transferred from the blanket of FIG. 1 to an adhesive tape showing transfer.
Figure 4:
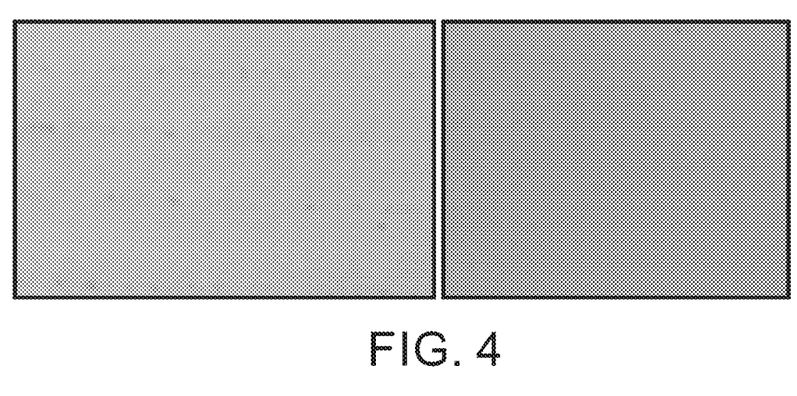
FIG. 4 is a drawing of an optical microscope image of the blanket of FIG. 2 after transfer showing some residual ink remaining for the amorphous polyester ink (left) but no ink remaining on the blank for the ink of the present disclosure comprising a combination of amorphous and crystalline polyester (right).

The inks were each separately jetted onto a fluorinated silicone blanket material, dried, and then pulled off (transferred) using adhesive tape. FIG. 2 shows a picture of an optical microscope image of the amorphous polyester ink of Example 3 (left side) and the amorphous and crystalline polyester ink of Example 4 (right side) which have been ink jetted onto the fluorinated silicone blanket using a Dimatix Printer (DMP 2800, Fujifilm USA). FIG. 3 shows a picture of an optical microscope image of the ink of Example 3 (left side) and Example 4 (right side) on the adhesive tape after the ink was pulled off the blanket. FIG. 4 shows a picture of an optical microscope image of the blanket after transfer for Example 3 (left side) and Example 4 (right side). The ink of Example 3 containing only amorphous polyester latex did not release completely from the blanker while the ink of Example 4 containing a mixture of amorphous and a crystalline polyester latex having a softening temperature of 95° C. and a glass transition temperature of 59° C. showed no ink remaining on the blanket. In contrast, the ink of Example 3, has a softening temperature of 105° C.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art an which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An aqueous ink for indirect printing applications comprising: water; a co-solvent; a colorant; and a polymer latex comprising an aqueous dispersion of polymer particles wherein the polymer latex has a softening temperature of from about 60° C. to less than 105° C. and a glass transition temperature of from about 45° C. to about 100° C.; wherein the polymer latex comprises a combination of amorphous polyester latex and crystalline polyester latex; and wherein the amorphous polyester latex having a glass transition temperature of from about 45° C. to about 100° C. and a crystalline polyester latex having a melting point of from about 50° C. to about 90° C.

2. The aqueous ink of claim 1, wherein the polymer particles have a volume average particle diameter of from about 50 nanometers to less than about 300 nanometers.

3. The aqueous ink of claim 1, wherein the ink composition comprises a composite latex particle, wherein the composite latex particle comprises an amorphous polyester having a glass transition temperature of from about 45° C. to about 100° C. and a crystalline polyester having a melting point of from about 50° C. to about 90° C.

4. The aqueous ink of claim 1, wherein the polymer latex comprises a combination of amorphous polyester and crystalline polyester, and wherein the crystalline polyester is in an amount of from about 5 percent to about 50 percent by weight, based on the total weight of both the amorphous polyester and crystalline polyester.

5. The aqueous ink of claim 1, wherein the polymer latex comprises poly(co-propoxylated bisphenol co-terephthalate co-fumarate, poly(1,9- nonanediol-co-dodecanedioic acid), or a mixture thereof.

6. The aqueous ink of claim 1, wherein the polymer latex comprises a polyester having a softening temperature of from about 60° C. to less than 105° C.

7. The aqueous ink of claim 1, wherein the polymer latex has a molecular weight of from about 5,000 to about 40,000 g/mole.

8. The aqueous ink of claim 1, wherein the ink has a surface tension of from about 15 to about 50 dynes per centimeter.

9. The aqueous ink of claim 1, wherein the ink has a viscosity of from about 2 to about 20 centipoise at a jetting temperature of from about 30° C. to about 40° C.

10. The aqueous ink of claim 1, wherein the co-solvent is selected from the group consisting of sulfolane, methyl ethyl ketone, isopropanol, 2- pyrrolidinone, glycols, glycerol, diethylene glycol, ethylene glycol, and mixtures thereof.

11. A process comprising: incorporating an aqueous ink comprising: water; a co-solvent; a colorant; and a polymer latex comprising an aqueous dispersion of polymer particles wherein the polymer latex has a softening temperature of from about 60° C. to less than 105° C. and a glass transition temperature of from about 45° C. to about 100° C.; wherein the polymer latex comprises a combination of amorphous polyester latex and crystalline polyester latex; and wherein the amorphous polyester latex having a glass transition temperature of from about 45° C. to about 100° C. and a crystalline polyester latex having a melting point of from about 50° C. to about 90° C. into an ink jet printing apparatus; ejecting droplets of ink in an imagewise pattern onto an intermediate transfer member; heating the image to partially or completely remove solvents; and transferring the ink in the imagewise pattern from the intermediate transfer member to a final recording substrate.

12. The process of claim 11, wherein the polymer particles having a volume average particle diameter of from about 50 nanometers to less than about 300 nanometers.

13. The process of claim 11, wherein the polymer latex has a molecular weight of from about 5,000 to about 40,000 g/mole.

14. The process of claim 11, wherein the ink has a surface tension of from about 15 to about 40 dynes per centimeter.

15. The process of claim 11, wherein the ink has a viscosity of from about 2 to about 20 centipoise at about 30° C.

* * * * *